(12) United States Patent
Kashihara et al.

(10) Patent No.: US 8,338,520 B2
(45) Date of Patent: Dec. 25, 2012

(54) FLUORORUBBER COMPOSITION AND PRODUCTION METHOD OF CROSS-LINKED FLUORORUBBER PRODUCT

(75) Inventors: Takayuki Kashihara, Fujisawa (JP); Muneyuki Watanabe, Fujisawa (JP)

(73) Assignee: NOK Corporation, Tokyo (JP)

( * ) Notice: Subject to any disclaimer, the term of this patent is extended or adjusted under 35 U.S.C. 154(b) by 138 days.

(21) Appl. No.: 12/546,401

(22) Filed: Aug. 24, 2009

(65) Prior Publication Data

US 2010/0056690 A1    Mar. 4, 2010

(30) Foreign Application Priority Data

Aug. 26, 2008 (JP) ................... 2008-217221

(51) Int. Cl.
*C08K 3/30* (2006.01)
(52) U.S. Cl. .............. 524/423; 525/326.4; 525/337; 525/375; 525/379; 525/387
(58) Field of Classification Search .......... 524/423; 525/326.4, 337, 375, 379, 387
See application file for complete search history.

(56) References Cited

U.S. PATENT DOCUMENTS

| 5,874,506 A * | 2/1999 | Tatsu et al. ............... 525/379 |
| 6,020,440 A * | 2/2000 | Tabb ........................ 525/379 |
| 2006/0217491 A1 | 9/2006 | Higashira et al. |
| 2009/0163671 A1 * | 6/2009 | Sano ......................... 525/416 |

FOREIGN PATENT DOCUMENTS

| JP | 2003221888 A | * | 8/2003 |
| JP | 2007-137977 A | | 6/2007 |
| JP | 2007-169511 A | | 7/2007 |
| JP | 2007169511 A | * | 7/2007 |
| WO | WO2004094479 | | 11/2004 |
| WO | WO2007058038 | | 5/2007 |
| WO | WO 2007058038 A1 | * | 5/2007 |

OTHER PUBLICATIONS

Machine translation of JP 2007169511 A.*
Machine translation of JP 2003221888 A.*

* cited by examiner

*Primary Examiner* — Ling Choi
*Assistant Examiner* — Wenwen Cai
(74) *Attorney, Agent, or Firm* — K. David Crockett, Esq.; Niky Economy Syrengelas, Esq.; Crockett & Crockett, PC

(57) ABSTRACT

A fluororubber composition which (1) is clean, (2) achieves a higher specific gravity, (3) achieves a better physical property in terms of breaking elongation, (4) is free of halogen substance (chlorine), and (5) provides a rubber surface which is non-tacky to metal(s); and a method for producing a crosslinked fluororubber product. The fluororubber composition includes a peroxide-crosslinkable fluororubber comprising a terfluoropolymer; barium sulfate; a peroxide crosslinking agent; and a salt having $BF_4^-$ as a counter ion; wherein the barium sulfate is included in an amount of 50 to 180 parts by weight based on 100 parts by weight of the fluoropolymer; and wherein the salt having $BF_4^-$ as a counter ion is included in an amount of 0.7 to 1.5 parts by weight based on 100 parts by weight of the fluoropolymer.

5 Claims, No Drawings

FLUORORUBBER COMPOSITION AND PRODUCTION METHOD OF CROSS-LINKED FLUORORUBBER PRODUCT

This application claims priority to Japanese Patent Application JP2008-217221 filed Aug. 26, 2008.

FIELD OF THE INVENTION

The present invention relates to a fluororubber composition and a production method of a cross-linked fluororubber product, and more particularly, to a fluororubber composition having a higher specific gravity and better physical properties, and a method for producing a crosslinked fluororubber product.

BACKGROUND OF THE INVENTION

With increased volumes of hard disks in recent years, it is necessary to improve precision of hard disk drives. Thus, balance-adjusting weights (hereinafter referred to as "balancers") are frequently used around disks of hard disk drives.

Since materials having higher specific gravities and good cleanliness are required as crosslinked rubber products to be used for balancers, crosslinked fluororubber products have been used conventionally.

Typical crosslinked fluororubber products, however, have specific gravities of about 1.8 to 2.1, so that several balancers are sometimes required to be used to adjust a balance of a disk, thereby problematically increasing a cost due to the several balancers.

Further, when disks are out of balance, it is sometimes impossible to fully balance them using balancers with the specific gravities conventionally used for balancers.

In view of the above, crosslinked rubber products having higher specific gravities while maintaining cleanliness are demanded for balancers. As a technique to increase a specific gravity of a crosslinked fluororubber product, it is known to blend barium sulfate thereinto, as a filler having a higher specific gravity and having less influence on physical properties of the crosslinked fluororubber product.

Blending of large amounts barium sulfate to achieve increased specific gravities of 2.2 or more, however, results in occurrence of influence on physical properties of the balancers, and particularly results in considerably decreased breaking elongations of crosslinked rubber products, such that molding of products is made difficult depending on the shapes of the products.

Meanwhile, it is a recently growing tendency to decrease amounts of halogens (particularly, chlorine and bromine) in the whole fields of electric and electronic components, so that balancers are also required to have lower halogen content.

Further, rubber surfaces are to be desirably non-tacky to metals so that balancers can be smoothly mounted, and breaking elongations of crosslinked rubber products are to be desirably large so that the crosslinked rubber products can be molded without difficulties even when shapes of the balancers are complicated.

In view of these points, examples of performances or physical properties required for crosslinked rubber products for balancers include: (1) to be clean (that is, to have antistatic properties sufficient to avoid attraction and adhesion of dust), (2) to have a higher specific gravity, (3) to have a better physical property in terms of breaking elongation, (4) to be free of halogen substance (chlorine), and (5) to have a rubber surface which is non-tacky to metal(s).

WO 2004/094479 discloses that a lower friction can be attained by using, for a polyol-crosslinkable fluororubber, bisphenol AF as a crosslinking agent and triphenylbenzylphosphonium chloride as a crosslinking accelerator.

However, although this technique is not so problematic in the points (1) to be clean, and (5) to be non-tacky to metal(s), this technique entails chlorine in the crosslinking accelerator, thereby problematically failing to fully meet the requirements.

WO 2007/058038 discloses that a lower friction can be attained by using, for a polyol-crosslinkable fluororubber, bisphenol AF as a crosslinking agent, and 5-benzyl-1,5-diazabicyclo[4.3.0]-5-nonenium tetrafluoroborate as a crosslinking accelerator.

However, although this technique is not so problematic in the points (1) to be clean, (4) to be free of halogen substance, and (5) to be non-tacky, blending of a large amount of filler having a higher specific gravity for an increased specific gravity results in deteriorated physical properties correspondingly to the blending amount, so that molding of products is problematically made difficult depending on shapes of the products.

Although Japanese Patent Publication JP2007-169511 uses, for a peroxide-crosslinkable fluororubber, 2,5-dimethylhexane-2,5-dihydroperoxide as a crosslinking agent and triallyl isocyanurate as a crosslinking aid, and uses triphenylbenzylphosphonium chloride for a lower friction in a manner that this technique is not so problematic in the points (1) to be clean and (5) to be non-tacky, this technique contains chlorine in the component for the lower friction, thereby failing to fully meet the requirements. Japanese Patent Publication JP2007-137977 discloses a fluororubber composition comprising a fluororubber crosslinkable with a polyol and uses an ammonium salt as a crosslinking aid and a polyol as a crosslinking agent, which is further blended with an electrically conductive additive.

SUMMARY OF THE INVENTION

An object of the present invention is to provide a fluororubber composition which (1) is clean, (2) achieves a higher specific gravity, (3) achieves a better physical property in terms of breaking elongation, (4) is free of halogen substance (chlorine), and (5) provides a rubber surface which is non-tacky to metal(s); and a method for producing a crosslinked fluororubber product.

Other objects of the invention will become apparent from the following description.

The above-described objects can be achieved by the following inventions.

One new composition achieving these goals is a fluororubber composition comprising:

a peroxide-crosslinkable fluororubber comprising a terfluoropolymer;

barium sulfate;

a peroxide crosslinking agent; and a salt having $BF_4^-$ as a counter ion;

wherein the barium sulfate is included in an amount of 50 to 180 parts by weight based on 100 parts by weight of the fluoropolymer; and wherein the salt having $BF_4^-$ as a counter ion is included in an amount of 0.7 to 1.5 parts by weight based on 100 parts by weight of the fluoropolymer.

One method for producing a crosslinked fluororubber product, comprises:
previously peroxide-crosslinking the fluororubber composition disclosed above; and
subsequently heat-treating the resulting crosslinked fluororubber composition at a temperature ranging from 200 to 300° C. for 0.1 to 48 hours, to obtain a crosslinked product having a specific gravity of 2.2 to 2.8 and a breaking elongation (%) of 250% or more as measured according to JIS K6251.

Another method for producing a crosslinked fluororubber product as disclosed above further includes that the breaking elongation (%) as measured according to JIS K6251 is at least 250% and not more than 350%.

Another invention is a balance-adjusting weight formed by using the crosslinked fluororubber product obtained by the method disclosed above.

The present invention provides a fluororubber composition which (1) is clean, (2) achieves a higher specific gravity, (3) achieves a better physical property in terms of breaking elongation, (4) is free of halogen substance (chlorine), and (5) provides a rubber surface which is non-tacky to metal(s); and a method for producing a crosslinked fluororubber product.

DETAILED DESCRIPTION OF THE PREFERRED EMBODIMENTS

Embodiments of the present invention are described below.
[Fluororubber Composition] The fluororubber composition of the invention comprises a peroxide-crosslinkable fluororubber comprising a terfluoropolymer; barium sulfate; a peroxide crosslinking agent; and a salt having BF4− as a counter ion.
<Fluororubber>
The fluororubber is peroxide-crosslinkable and comprises a terfluoropolymer, and a ternary copolymer of fluorine-containing olefins is usable as the terfluororubber polymer.
Specific examples of fluorine-containing olefins include vinylidene fluoride, hexafluoropropylene, pentafluoropropylene, trifluoroethylene, trifluorochloroethylene, tetrafluoroethylene, vinyl fluoride, perfluoroacrylic esters, perfluoroalkyl acrylates, perfluoromethyl vinyl ether, perfluoropropyl vinyl ether, and the like.
Preferable examples of the fluororubber comprising terfluoropolymer include vinylidene fluoride-hexafluoropropylene-tetrafluoroethylene ternary copolymer (abbreviation: VDF-HFP-TFE), vinylidene fluoride-perfluoro(methyl vinyl ether)-tetrafluoroethylene ternary copolymer (abbreviation: VDF-FMVE-TFE), and the like.
These fluororubbers can be obtained by solution polymerization, suspension polymerization, or emulsion polymerization according to conventionally known methods, and are commercially available ("Viton GLT 600S" manufactured by DuPont, and the like, for example).
<Crosslinking Agent>
A peroxide crosslinking agent is used as the crosslinking agent, and an organic peroxide crosslinking agent can be preferably used as the peroxide crosslinking agent.
Examples of usable organic peroxide crosslinking agents include 2,5-dimethylhexane-2,5-dihydroperoxide; 2,5-dimethyl-2,5-di(benzoylperoxy)hexane; tert-butyl peroxide; dicumyl peroxide; tert-butyl cumyl peroxide; 1,1-di(tert-butylperoxy)-3,3,5-trimethylcyclohexane; 2,5-dimethyl-2,5-di(tert-butylperoxy)hexane; 2,5-dimethyl-2,5-di(tert-butylperoxy)hexyne-3; 1,3-di(tert-butylperoxyisopropyl)benzene; tert-butylperoxy benzoate; tert-butylperoxyisopropyl carbonate; n-butyl-4,4-di(tert-butylperoxy)valerate; etc. These crosslinking agents can be used as purchased (for example, "Perhexa 25B-40", manufactured by NOF Corporation).

In the invention, triallyl isocyanurate or the like can be added as a crosslinking aid.
<Crosslinking Accelerator>
As the salt having BF4− (tetrafluoroborate ion) as a counter ion for use as a crosslinking accelerator in the invention, a quarternary ammonium salt can be used represented by general formula (1) below:

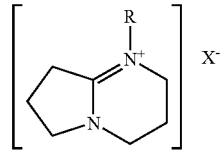

[Formula 1]

wherein R represents a C1-C24 alkyl group or a C7-C20 aralkyl group; and X− represents a tetrafluoroborate group.

Preferable examples of the quarternary ammonium salt include 5-benzyl-1,5-diazabicyclo[4.3.0]-5-nonenium tetrafluoroborate.

5-benzyl-1,5-diazabicyclo[4.3.0]-5-nonenium tetrafluoroborate is desirable from a viewpoint of improved dispersibility, because it has a melting point of about 80° C. and easily melts during heat kneading (100° C.) using a roll, a kneader, a Banbury mixer, or the like.

In the invention, the salt having BF4− as a counter ion also has the effect of improving non-tackiness.

A commercially available master batch containing a raw rubber and a quarternary ammonium salt may also be used as the salt having BF4− as a counter ion for use in the invention.
<Barium Sulfate>
In the invention, barium sulfate is added to achieve a higher specific gravity.

As barium sulfate for use in the invention, a commercially available typical product can be used.
<Other Blending Components>
In the invention, components generally used in the rubber industry may be added in addition to the above components, as required, as other blending components within a range such that the effects of the barium sulfate, crosslinking agent and crosslinking accelerator used in the invention are not impaired. Examples of other blending components include reinforcing agents such as carbon black and carbon fiber; fillers such as hydrotalcite (Mg6Al2(OH)16CO3), calcium carbonate, magnesium carbonate, aluminum hydroxide, magnesium hydroxide, aluminum silicate, magnesium silicate, calcium silicate, potassium titanate, titanium oxide, aluminum borate, glass fiber, aramid fiber, and the like; processing aids such as waxes, metallic soaps, and the like; acid acceptors such as calcium hydroxide, magnesium oxide, zinc oxide, and the like; antioxidants; thermoplastic resins; etc.
<Blending Ratio>
The blending amount of barium sulfate is in a range of 50 to 180 parts by weight based on 100 parts by weight of the fluoropolymer, and preferably in a range of 100 to 150 parts by weight. Amounts less than 50 parts by weight fail to obtain an intended higher specific gravity, and amounts more than 180 parts by weight result in a notably deteriorated kneading processability (discharging ability from kneader), thereby diminishing productivity.

Moreover, the blending amount of the salt having BF4− as a counter ion is in a range of 0.7 to 1.5 parts by weight, and preferably in a range of 0.7 to 0.9 part by weight based on 100 parts by weight of the fluoropolymer. Amounts less than 0.7 part by weight fail to make a rubber surface non-tacky, and amounts more than 1.5 parts by weight result in an unchanged effect of non-tackiness, thereby rather increasing cost.

In the invention, the peroxide crosslinking agent is preferably contained at a content in a range of 0.5 to 5 parts by weight, and more preferably in a range of 1 to 3 parts by weight based on 100 parts by weight of the fluoropolymer.

Conventionally, barium sulfate has been added in an amount less than 100 parts by weight, to maintain kneading processability, physical properties, and the like. In the invention, better physical properties can be achieved (for example, a breaking elongation of 250 to 350%), even when barium sulfate is contained in a preferable blending amount of 100 parts by weight to 150 parts by weight so as to achieve a higher specific gravity of a crosslinked fluororubber product. Moreover, since the salt having BF4– as a counter ion enhances a non-tacky effect, desirable and better physical properties and non-tackiness can be kept even when barium sulfate is added in a larger amount.

<Preparation>

Examples of methods for preparing the fluororubber composition according to the invention include a method in which predetermined amounts of the above-described components are kneaded using a closed kneader such as an intermix, a kneader, or a Banbury mixer, or using a general kneader for rubber such as an open roll mill; a method in which each component is dissolved in a solvent or the like and dispersed with a stirrer or the like; and so forth.

[Method for Producing Crosslinked Fluororubber Product]

<Primary Crosslinking (Vulcanization)>

The fluororubber composition obtained as described above can be crosslinked (vulcanized) and molded by heating (primary crosslinking) typically at a temperature of 140 to 230° C. for about 1 to 120 minutes, using an injection molding machine, a compression molding machine, a vulcanizing press, an oven, or the like.

Although the primary crosslinking (vulcanization) is a process of crosslinking the fluororubber composition to such a degree that its shape can be maintained to form (pre-form) a certain shape, and primary crosslinking (vulcanization) can also be performed in an air oven or the like, the composition is preferably molded with a mold in the case of a complicated shape.

In the invention, when a fluororubber composition is kneaded and then the resulting processed product is compression molded, the composition after kneading may typically be compression molded by (a) cooling back to room temperature once and heating again, or (b) heating continuously after kneading. In the compression step using a compression molding machine, the method (a) above is typically employed.

If the fluororubber composition is preformed into a certain shape before crosslinking (vulcanization), a low-friction and low-tackiness article can be obtained by either of the method (a) or (b). The degree of low-tackiness of the obtained crosslinked fluororubber product is not influenced by details of a temperature elevation pattern, a temperature elevation curve, or the like preceding to a heat treatment, but determined by a temperature and a time for performing the heat treatment.

<Heat Treatment>

In the invention, a heat treatment (secondary crosslinking (vulcanization)) is performed after the primary crosslinking (vulcanization). Although this heat treatment method is the same as usual secondary crosslinking (vulcanization), unless the fluororubber composition of the invention is used, a crosslinked fluororubber product, having a higher specific gravity and better physical properties and capable of realizing a rubber surface which is non-tacky to metal(s), cannot be obtained even if usual secondary crosslinking (vulcanization) is performed.

As the heat treatment after primary crosslinking (vulcanization), the fluororubber composition (primary crosslinked product) of the invention is heated to a temperature in a range of 200° C. to 300° C., and preferably in a range of 250° C. to 260° C. The heat-treatment time is from 0.1 to 48 hours, preferably 1 to 48 hours, and more preferably 10 to 48 hours.

<Physical Properties of Crosslinked Fluororubber Product>

The crosslinked fluororubber product obtained in this way has a specific gravity of 2.2 to 2.8, and a breaking elongation of 250 to 350% measured according to JIS K6251. Moreover, the crosslinked product of the invention is also non-tacky to metal(s).

Namely, the crosslinked product of the invention can meet all the five conditions: (1) to be clean, (2) to have a higher specific gravity, (3) to have better physical properties (breaking elongation of 250% or more), (4) to be free of halogen substance (chlorine), and (5) to have a rubber surface which is non-tacky to metal(s).

Accordingly, the crosslinked product can be utilized for a fluororubber product required to have a higher specific gravity and to exhibit cleanliness, particularly as a balance-adjusting weight (balancer) of a disk within a hard disk drive.

EXAMPLES

Examples of the present invention are hereinafter described; however, the invention is not limited by the Examples.

Example 1

| | |
|---|---|
| Fluororubber comprising terfluoropolymer ("Viton GLT 600S" manufactured by DuPont Dow Elastomers; Mooney viscosity ML1 + 10 (121° C.): 65) | 100 parts by weight |
| Barium sulfate | 130 parts by weight |
| Zinc oxide by Seido Chemical Industry Co., Ltd.) | 3 parts by weight |
| Crosslinking aid: Triallyl isocyanurate ("TAIC M-60" by Nippon Kasei Chemical Co., Ltd.) | 3 parts by weight |
| Crosslinking agent: 2,5-dimethylhexane-2,5-dihydroperoxide ("Perhexa 25B-40" by NOF Corporation) | 2 parts by weight (note: thrown into a roll) |
| Crosslinking accelerator: 5-benzyl-1,5-diazabicyclo[4.3.0]-5-nonenium tetrafluoroborate | 0.9 part by weight (note: thrown into a roll) |

The above-listed components (except for the crosslinking components) were thrown into a kneader and kneaded for 20 minutes, after which the crosslinking components were thrown into an open roll mill, thereby preparing a composition.

The resulting composition was pressurized and crosslinked (vulcanized) at 170° C. for 20 minutes to mold a crosslinked product, and secondary crosslinking (vulcanization) was further performed in an oven at 260° C. for 10 hours, thereby producing a crosslinked fluororubber product.

<Evaluation>
1. Specific Gravity and Breaking Elongation

A specific gravity and a breaking elongation of a test sample of the obtained crosslinked fluororubber product were measured by the following method, and the results are shown in Table 1.

Specific gravity: measured according to JIS Z8807

Breaking elongation (%): measured according to JIS K6251

2. Non-tackiness

A compression set test piece (large test piece) of the crosslinked fluororubber product, according to JIS K6262, was placed on a stainless plate, a sash weight of 100 g was then put on the test piece, and the test piece was moved parallel to the stainless plate in the state that the test piece and the stainless plate were closely contacted with each other, followed by evaluation based on the following criterion, and the result of which is shown in Table 1.

A: test piece was easily movable (excellent non-tackiness)

B: test piece was tacked to the stainless plate and immovable (bad non-tackiness)

3. Processability (Discharging Ability From Kneader):

Discharging ability of the composition upon discharging from the kneader after kneading was evaluated based on the following criterion, and the result of which is shown in Table 1.

A: situation where rubber was not tacked to a rotor of kneader, and the rubber was allowed to be relatively easily discharged.

B: situation where rubber was tacked to a rotor of kneader, and 10 minutes or longer were required for discharging the rubber.

4. Presence/Absence of Halogen Inclusion: A Fact Based on the Rubber Composition is Shown in Table 1.

Example 2

Evaluation was performed in the same manner as Example 1, except that the blending amount of the crosslinking accelerator (5-benzyl-1,5-diazabicyclo[4.3.0]-5-nonenium tetrafluoroborate) was changed to 0.7 part by weight. The results are shown in Table 1.

Example 3

Evaluation was performed in the same manner as Example 1, except that the blending amount of the crosslinking accelerator (5-benzyl-1,5-diazabicyclo[4.3.0]-5-nonenium tetrafluoroborate) was changed to 1.5 parts by weight. The results are shown in Table 1.

Example 4

Evaluation was performed in the same manner as Example 1, except that the blending amount of barium sulfate was changed to 50 parts by weight. The results are shown in Table 1.

Comparative Example 1

Evaluation was performed in the same manner as Example 1, except that the blending amount of barium sulfate was changed to 190 parts by weight. The results are shown in Table 1.

Although the components (except for the crosslinking components) of the fluororubber composition were thrown into a kneader and kneading was performed, the rubber was tacked to the rotor of the kneader and could not be discharged, so that evaluation was abandoned.

Comparative Example 2

Evaluation was performed in the same manner as Example 1, except that the blending amount of the crosslinking accelerator (5-benzyl-1,5-diazabicyclo[4.3.0]-5-nonenium tetrafluoroborate) was changed to 0.5 part by weight. The results are shown in Table 1.

Comparative Example 3

| | |
|---|---|
| Fluororubber comprising binary fluoropolymer: ("Viton A-500" manufactured by DuPont Dow Elastomers; Mooney viscosity $ML_{1+10}$ (121° C.): 45) | 100 parts by weight |
| Barium sulfate | 50 parts by weight |
| Hydrotalcite ("DHT-4A" manufactured by Kyowa Chemical Industry Co., Ltd.) | 3 parts by weight |
| Calcium hydroxide ("CALDIC #2000" manufactured by Ohmi Chemical Industry, Ltd.) | 3 parts by weight |
| Crosslinking aid: bisphenol AF (a master batch of 50 wt % of "CURATIVE VC #30" and 50 wt % of fluororubber "Viton E-45", manufactured by DuPont Dow Elastomers) | 3.5 parts by weight (note: thrown into a roll) |
| Crosslinking accelerator: 5-benzyl-1,5-diazabicyclo[4.3.0]-5-nonenium tetrafluoroborate | 0.875 part by weight (note: thrown into a roll) |

A crosslinked fluororubber product was obtained from the above-listed components in the same manner as Example 1, and evaluated. The results are shown in Table 1.

Comparative Example 4

Evaluation was performed in the same manner as Comparative Example 3, except that the blending amount of barium sulfate was changed to 125 parts by weight. The results are shown in Table 1.

TABLE 1

| | | Ex. 1 | Ex. 2 | Ex. 3 | Ex. 4 | Com. Ex 1 | Com. Ex 2 | Com. Ex 3 | Com. Ex 4 |
|---|---|---|---|---|---|---|---|---|---|
| Blending component | Viton GLT 600S (terfluoropolymer) | 100 | 100 | 100 | 100 | 100 | 100 | | |
| | Viton A-500 (binary fluoropolymer) | | | | | | | 100 | 100 |
| | Barium sulfate | 130 | 130 | 130 | 50 | 190 | 130 | 50 | 125 |
| | Zinc oxide | 3 | 3 | 3 | 3 | 3 | 3 | | |
| | Hydrotalcite (DHT-4A) | | | | | | | 3 | 3 |

TABLE 1-continued

| | | Ex. 1 | Ex. 2 | Ex. 3 | Ex. 4 | Com. Ex 1 | Com. Ex 2 | Com. Ex 3 | Com. Ex 4 |
|---|---|---|---|---|---|---|---|---|---|
| | Calcium hydroxide | | | | | | | 3 | 3 |
| | TAIC M-60 | 3 | 3 | 3 | 3 | 3 | 3 | | |
| | Perhexa 25B-40 (peroxide crosslinking agent) | 2 | 2 | 2 | 2 | 2 | 2 | | |
| | CURATIVE #30 (bisphenol AF masterbatch) | | | | | | | 3.5 | 3.5 |
| | 5-benzyl-1,5-diazabicyclo[4.3.0]-5-nonenium tetrafluoroborate | 0.9 | 0.7 | 1.5 | 0.9 | 0.9 | 0.5 | 0.875 | 0.875 |
| Molding condition | Primary crosslinking (vulcanization) (° C./min) | 170/20 | 170/20 | 170/20 | 170/20 | 170/20 | 170/20 | 170/20 | 170/20 |
| | Secondary crosslinking (vulcanization) (° C./h) | 260/10 | 260/10 | 260/10 | 260/10 | 260/10 | 260/10 | 260/10 | 260/10 |
| Physical property | Breaking elongation (%) JIS K6251 | 300 | 310 | 280 | 330 | — | 310 | 220 | 130 |
| | Specific gravity JIS Z8807 | 2.65 | 2.64 | 2.66 | 2.24 | | 2.62 | 2.22 | 2.60 |
| Processability (discharging ability from kneader) | | A | A | A | A | B | A | A | A |
| Non-tackiness | | A | A | A | A | — | B | A | A |
| Presence/absence of inclusion of halogen (Cl) | | absent | absent | absent | absent | absent | absent | absent | absent |

From the results of Examples 1, 2, and 3, non-tackiness is obtainable by 5-benzyl-1,5-diazabicyclo[4.3.0]-5-nonenium tetrafluoroborate in a range of 0.7 to 1.5 parts by weight, and the breaking elongation is about 300% then.

In Example 4, barium sulfate was blended in an amount of 50 parts by weight to achieve a targeted specific gravity 2.2 or larger.

In Comparative Example 1, the amount of barium sulfate was excessive, so that the rubber was tacked to the rotor of the kneader and was not dischargeable therefrom.

In Comparative Example 2, the amount of 5-benzyl-1,5-diazabicyclo[4.3.0]-5-nonenium tetrafluoroborate was small, so that a non-tacky effect was not obtained.

In Comparative Example 3, although the amount of barium sulfate was adjusted to provide a specific gravity near the lower limit of the required property, the elongation was 220% insofar as provided by the polyol-crosslinkable binary polymer, thereby failing to fully meet the physical properties.

In Comparative Example 4, although barium sulfate in the same amount as Examples 1 to 3 was blended into the polyol-crosslinkable binary polymer to achieve the comparable specific gravity, the elongation was deteriorated down to 130%, which was recognized to be considerably lower than a practical range.

What is claimed is:

1. A fluororubber composition comprising:
    a peroxide-crosslinkable fluororubber comprising a terfluoropolymer;
    barium sulfate;
    a peroxide crosslinking agent; and
    a quaternary ammonium salt represented by the formula;

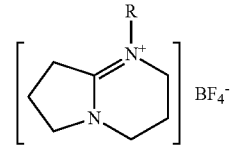

wherein the barium sulfate is included in an amount of 130 to 150 parts by weight based on 100 parts by weight of the fluoropolymer; and
wherein the salt having $BF_4^-$ as a counter ion is included in an amount of 0.7 to 1.5 parts by weight based on 100 parts by weight of the fluoropolymer.

2. A method for producing a crosslinked fluororubber product, comprising:
    previously peroxide-crosslinking the fluororubber composition according to claim 1; and
    subsequently heat-treating the resulting crosslinked fluororubber composition at a temperature ranging from 200 to 300° C. for 0.1 to 48 hours, to obtain a crosslinked product having a specific gravity of 2.2 to 2.8 and a breaking elongation (%) of 250% or more as measured according to JIS K6251.

3. The method for producing a crosslinked fluororubber product according to claim 2, wherein the breaking elongation (%) as measured according to JIS K6251 is at least 250% and not more than 350%.

4. A balance-adjusting weight formed by using the crosslinked fluororubber product obtained by the method according to claim 2.

5. A balance-adjusting weight formed by using the crosslinked fluororubber product obtained by the method according to claim 3.

* * * * *